United States Patent
Anton et al.

(10) Patent No.: US 9,144,855 B2
(45) Date of Patent: Sep. 29, 2015

(54) MOULD FOR SOLDERING, ARRANGEMENT OF MOULDS, A METHOD AND A COMPONENT

(75) Inventors: Reiner Anton, Berlin (DE); Brigitte Heinecke, Mülheim an der Ruhr (DE); Michael Ott, Mülheim an der Ruhr (DE); Christian Ressel, Zerf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 964 days.

(21) Appl. No.: 13/133,967

(22) PCT Filed: Nov. 19, 2009

(86) PCT No.: PCT/EP2009/065450
§ 371 (c)(1),
(2), (4) Date: Jun. 10, 2011

(87) PCT Pub. No.: WO2010/069696
PCT Pub. Date: Jun. 24, 2010

(65) Prior Publication Data
US 2011/0244264 A1    Oct. 6, 2011

(30) Foreign Application Priority Data

Dec. 15, 2008  (EP) .................................... 08021762

(51) Int. Cl.
*B32B 3/26* (2006.01)
*B32B 3/30* (2006.01)
(Continued)

(52) U.S. Cl.
CPC ................ *B23K 1/0018* (2013.01); *B23K 3/08* (2013.01); *B23K 26/03* (2013.01); *B23K 26/203* (2013.01);
(Continued)

(58) Field of Classification Search
CPC ............... Y10T 428/12479; Y10T 428/12361; Y10T 428/12375; Y10T 428/12382; Y10T 428/12486; Y10T 428/12493; Y10T 428/12994; Y10T 428/12931; Y10T 428/249953; Y10T 428/249981; Y10T 428/12944; B32B 3/26; B32B 3/30; B32B 15/00; B32B 15/01
USPC ................ 428/596, 597, 598, 613, 614, 615, 428/304.4, 33, 306.6, 307.3, 675, 678, 679, 428/680
See application file for complete search history.

(56) References Cited

U.S. PATENT DOCUMENTS

| 5,456,004 | A | 10/1995 | Swamy | |
|---|---|---|---|---|
| 6,024,792 | A | 2/2000 | Bieler | |
| 2003/0150899 | A1* | 8/2003 | Eberlein et al. | 228/119 |

FOREIGN PATENT DOCUMENTS

| DE | 19963714 A1 | 7/2001 |
|---|---|---|
| DE | 102004025692 A1 | 12/2005 |

(Continued)

*Primary Examiner* — Michael E La Villa

(57) ABSTRACT

The use of pre-sintered soldering plates, referred to as PSPs, frequently proceeds without a continuous, cohesive soldering connection between individual grains in the sinter material and between the sinter and base material. A process soldering of prefabricated, perforated, porous or drilled plates or porous, spongy, laminar material that, can be laid full-surfaced on a base element as a plurality of tiles or as individual porous, drilled or perforated inlay elements designed contour-close on a recess in the base material is provided. To this end, the selected plate materials can be mechanically equal to the base material or otherwise set off for the particular requirements of the component insert. The solder can be offset by specific diffusible, melting-point-lowering components. A mold that has an open, continuous porosity so that melted or fluid solder can flow through from the one surface to the other surface is also provided.

9 Claims, 4 Drawing Sheets

(51) Int. Cl.

| | | |
|---|---|---|
| B32B 15/00 | (2006.01) | |
| B32B 15/01 | (2006.01) | |
| F01D 5/00 | (2006.01) | |
| B23K 1/00 | (2006.01) | |
| F16B 5/00 | (2006.01) | |
| B23K 3/08 | (2006.01) | |
| B23K 26/03 | (2006.01) | |
| B23K 26/20 | (2014.01) | |
| B23K 26/30 | (2014.01) | |
| B23K 37/06 | (2006.01) | |

(52) U.S. Cl.
CPC ............... *B23K 26/422* (2013.01); *B23K 37/06* (2013.01); *B32B 3/26* (2013.01); *B32B 3/30* (2013.01); *B32B 15/00* (2013.01); *B32B 15/01* (2013.01); *F01D 5/005* (2013.01); *B23K 2201/001* (2013.01); *F05D 2230/22* (2013.01); *F05D 2230/237* (2013.01); *F05D 2250/131* (2013.01); *F05D 2250/70* (2013.01); *F05D 2260/36* (2013.01); *Y02T 50/67* (2013.01); *Y10T 428/12229* (2015.01); *Y10T 428/12361* (2015.01); *Y10T 428/12375* (2015.01); *Y10T 428/12382* (2015.01); *Y10T 428/12479* (2015.01); *Y10T 428/12486* (2015.01); *Y10T 428/12493* (2015.01); *Y10T 428/12931* (2015.01); *Y10T 428/12944* (2015.01); *Y10T 428/249953* (2015.04); *Y10T 428/249981* (2015.04)

(56) References Cited

FOREIGN PATENT DOCUMENTS

| | | |
|---|---|---|
| EP | 412397 B1 | 2/1991 |
| EP | 0 486 489 81 | 5/1992 |
| EP | 0 786 017 B1 | 7/1997 |
| EP | 0 892 090 A1 | 1/1999 |
| EP | 1306454 A1 | 5/2003 |
| EP | 1319729 A1 | 6/2003 |
| EP | 1204776 B1 | 6/2004 |
| GB | 2244719 A | 12/1991 |
| GB | 2305877 A | 4/1997 |
| WO | WO 9967435 A1 | 12/1999 |
| WO | WO 0044949 A1 | 8/2000 |

* cited by examiner

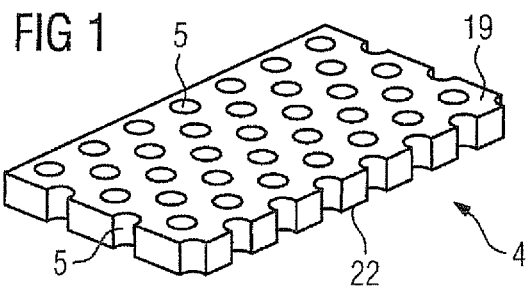
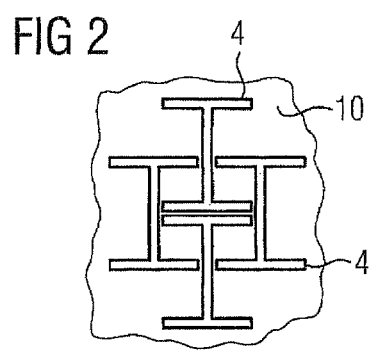
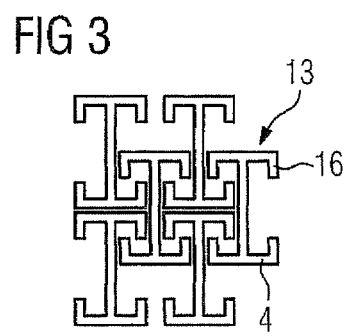
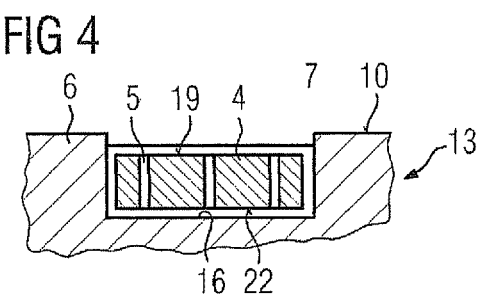
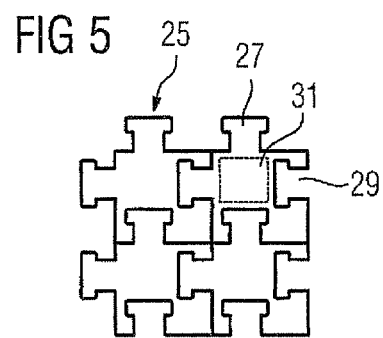
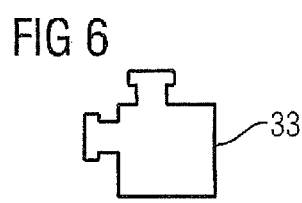
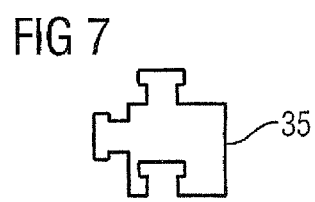

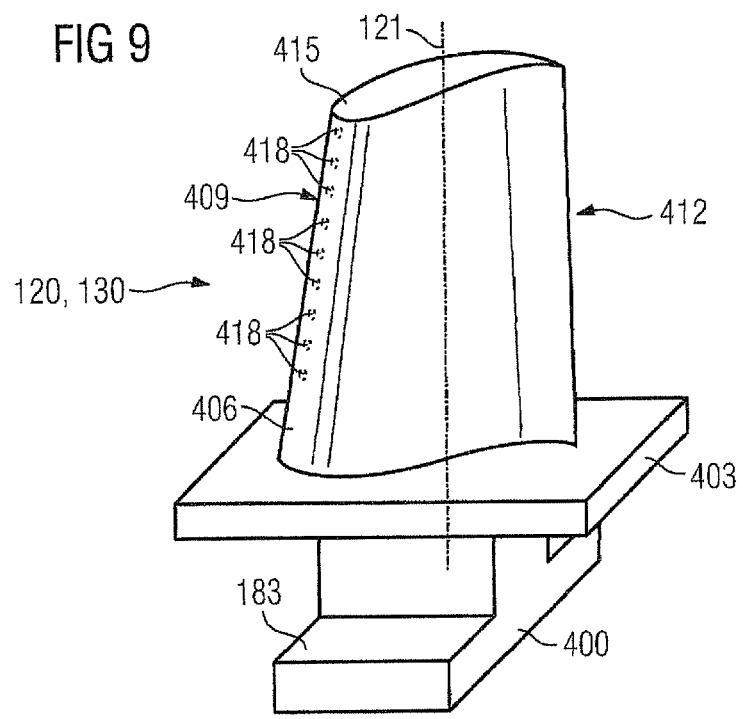
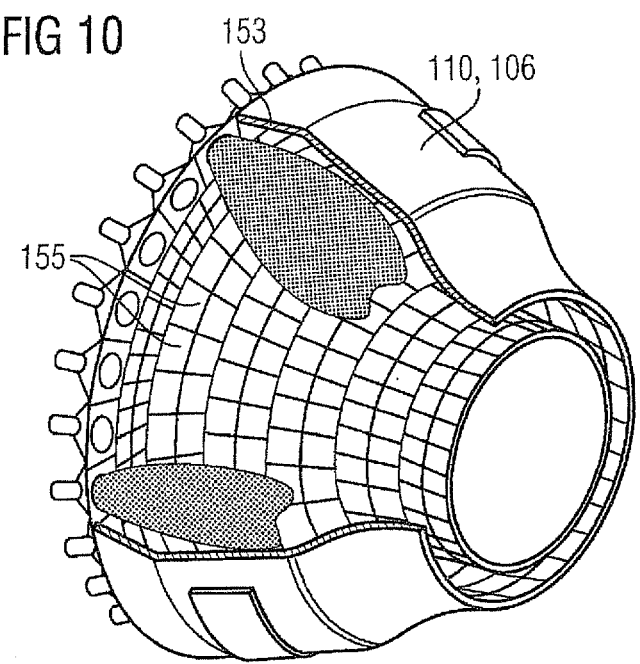

FIG 11

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | 1.50 |
| MAR M 002 | 0.15 | 9.0 | Rem. | 10.0 | | 10.0 | 2.5 | | 5.5 | 1.5 | 0.015 | 0.05 | 1.40 |
| MAR M 247 LC DS | 0.07 | 8.1 | Rem. | 9.2 | 0.5 | 9.5 | 3.2 | | 5.6 | 0.7 | 0.015 | 0.02 | |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

Chemical composition in %

MOULD FOR SOLDERING, ARRANGEMENT OF MOULDS, A METHOD AND A COMPONENT

CROSS REFERENCE TO RELATED APPLICATIONS

This application is the US National Stage of International Application No. PCT/EP2009/065450, filed Nov. 19, 2009 and claims the benefit thereof. The International Application claims the benefits of European Patent Office application No. 08021762.3 EP filed Dec. 15, 2008. All of the applications are incorporated by reference herein in their entirety.

FIELD OF INVENTION

The invention relates to porous moldings and an arrangement which are used during soldering, to a process and also to components produced thereby.

BACKGROUND OF INVENTION

Solder-application processes are used to restore removed material during the repair of components, e.g. turbine blades or vanes. Owing to the use of presintered sheet or flat material (presintered preform=PSP), attachment defects, porosities and other mechanical flaws arise in the soldering result on the substrate over the course of their application.

For the repair of turbine blades or vanes by soldering processes using PSPs, to date use has been made of presintered sheets or flat materials, consisting of high-melting proportions of alloy and low-melting proportions of solder, which, during the soldering process, achieve melt wetting and therefore soldering between the base material (the component) and the high-melting proportions of sinter of the PSP. Depending on the mixing ratios between high-melting and low-melting proportions and also depending on grain morphologies in the sintered material, incomplete wetting both of the sintered material and of the base material often occurs here.

SUMMARY OF INVENTION

It is an object of the invention to rectify the aforementioned problems.

The object is achieved by moldings as claimed in the claims, by an arrangement as claimed in the claims, by a process as claimed in the claims and by a component as claimed in the claims.

The dependent claims list further advantageous measures which can be combined with one another, as desired, in order to obtain further advantages.

The invention is based on the concept of soldering pieces of prefabricated flat material, which are cast, rolled or sintered and consist solely of material relevant to strength and wear without proportions of solder, alongside one another with solder on a substrate with a tile-like geometry, which involves hooking with a form fit or a full-surface fit or no hooking. Here, the pieces of flat material to be soldered are preferably made suitably continuous, so as to ensure that solder is applied to the side which is remote from the substrate before joining and so as to ensure that said solder can flow into the gap between the pieces of flat material and the substrate by capillary action during the soldering process. Furthermore, the gap width held between the individual pieces of flat material hooked to one another also ensures that the solder can flow therein by capillary action.

BRIEF DESCRIPTION OF THE DRAWINGS

FIGS. 1, 2, 3, 4, 5, 6 and 7 show porous moldings,
FIG. 9 shows a turbine blade or vane,
FIG. 10 shows a combustion chamber,
and
FIG. 11 shows a list of superalloys.

Figure 8:
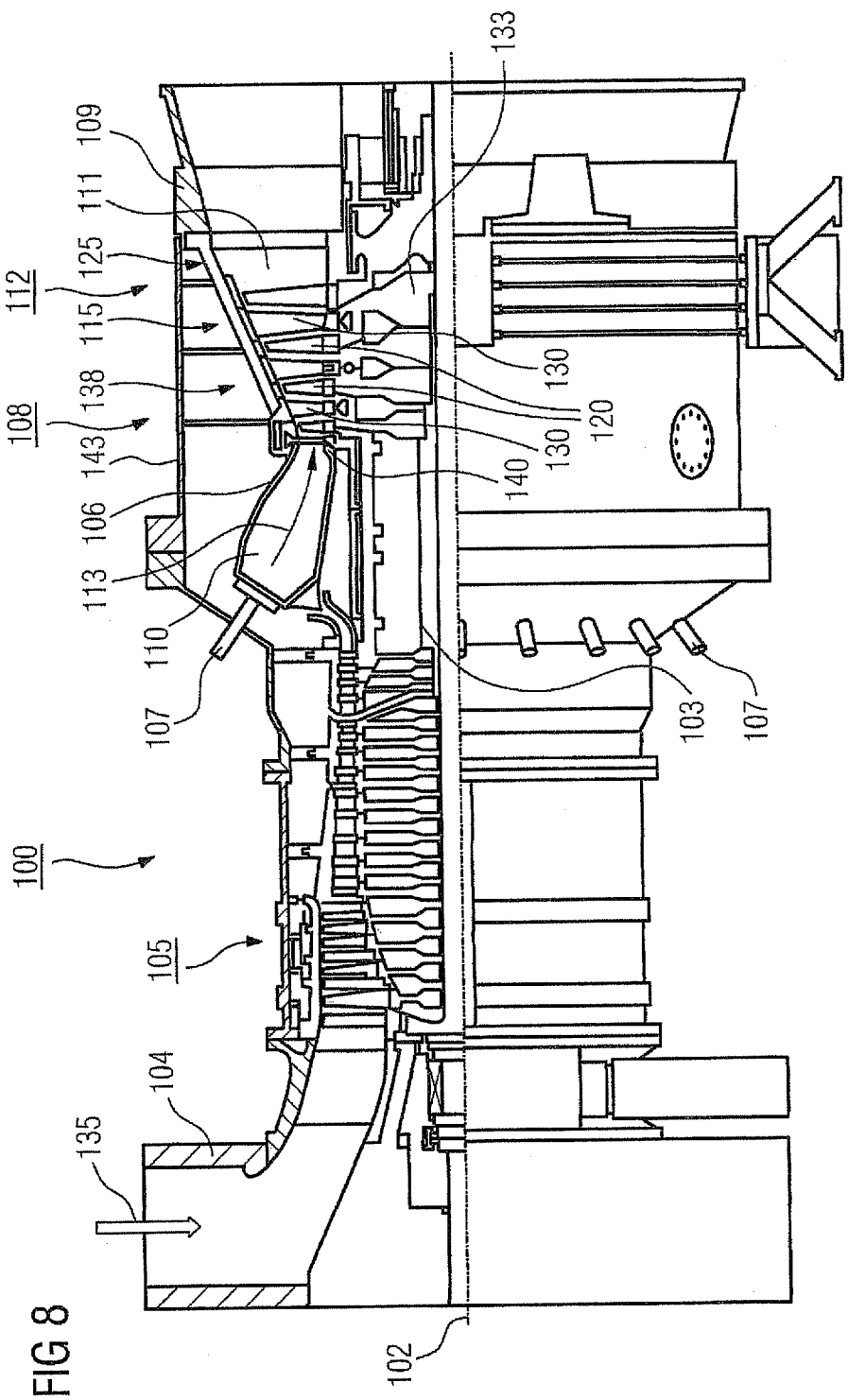
FIG. 8 shows a gas turbine.

The figures and the description represent only exemplary embodiments of the invention.

DETAILED DESCRIPTION OF INVENTION

FIG. 1 shows a molding 4, which is present in the form of flat material and is preferably formed as a sheet or preferably in rolled, sintered or cast form and the thickness of which is preferably measured according to the depth of the material removal on the component 6, 13 (FIG. 4) which is to be mended with the solder application and the use of said molding 4, and which molding has continuous passages 5, i.e. is preferably perforated or bored.

It is likewise preferably possible to use a sponge-like structure which comprises an open, continuous porosity, such that molten or liquid solder can flow through from one surface 19 (FIG. 4) of the molding 4 to the other surface 22 (FIG. 4) of the molding 4.

The combination of perforations, bores or pores (sponge) is likewise preferably possible.

Typical thicknesses of the flat material are 0.5 mm to 1.5 mm, preferably 0.7 mm to 1.2 mm.

Flat means that a thickness d of the molding 4: $d \ll a, b$, where a and b are the length and width of the molding 4.

The diameter of perforations 5 in the molding 4 here has to be such as to ensure that the solder can flow between the top side 19 and the bottom side 22 of each molding 4 by capillary action. Here, the typical diameter of perforations or the typical pore size ensues from the capillary height of rise of the molten solder, which should preferably correspond at least to the thickness of the perforated/porous molding.

The diameter of the perforation 5 is preferably between 0.05 mm and 0.3 mm.

In addition, the distance between the individual perforations 5 is such as to ensure that the gap between the molding 4 and the substrate 6 is supplied with solder by the capillary flow into bores 5 and gaps (FIG. 4) within the process times to be applied.

The material of this porous molding 4 is preferably metallic, in particular a nickel-based superalloy, and preferably corresponds to the material of the component 6 (FIG. 4) to be repaired.

Therefore, in addition to nickel, cobalt, chromium and aluminum, it preferably also comprises at least one of the elements molybdenum (Mo), tungsten (W), titanium (Ti) and/or tantalum (Ta).

The component 13 likewise preferably comprises a nickel=based or cobalt-based alloy.

FIG. 2 shows a porous molding 4, which has the form of a double T and which is applied to a component 13 (in FIG. 4) in a special arrangement.

Here, two double T-pieces are preferably placed one onto another longitudinally (one above another), and to the side thereof there is a further T-piece, which encompasses the two directly adjoining T-ends of the first two T-pieces by way of its T-ends. Hooking thereby takes place.

FIG. 3 shows a further exemplary embodiment of moldings 4, in which the moldings 4 likewise have a double T structure with an additional hooked formation 16 at the ends of the T bar 13.

As a result, the T pieces engage into one another even more effectively and are hooked to one another in both directions in a plane, where this would be the case only in one direction in FIG. 2.

Appropriate dimensioning ensures both filling of the solder into the gaps between individual moldings by capillary action and adaptation to a possible substrate curvature while keeping a gap which can be filled maximally by capillary flow with respect to the substrate 6.

The surface to be repaired is covered almost completely by the moldings 4 apart from small gaps, such that the substrate 6 can only then be identified through the gaps between the moldings 4.

The double pieces can also be cut in half in the edge region of the site to be repaired.

The gaps between the moldings 4 are individually adapted and are shown only schematically in FIGS. 2 and 3.

The component 13 to be repaired preferably comprises a recess 7 into which the porous moldings 4 are placed (FIG. 4).

It is preferable to use only one molding 4 vertically (i.e. from 16 toward 10). The stacking of moldings 4 is also preferably possible, however.

A solder material is applied preferably beforehand to the bottom side 16 of the mix recess 7.

The porous molding 4 is then placed into the recess 7 or onto the surface 16 with or without prior introduction of a solder material onto the surface 16.

Solder material is then applied to the outer surface 19 of the molding 4 and, as a result of heat treatment and as a result of the capillary forces, the liquid solder flows into pores/bores/perforations and into gaps between individual moldings and into gaps between the base body and the molding.

The recess 7 is filled and the component 13 has its original wall thickness again.

A solder material is any material having a melting point which is at least 10° C. lower than that of the material of the porous/bored/perforated molding 4 and of the base material.

FIG. 5 shows a molding 4, which, in this example, has the geometry of a puzzle piece 25, which is suitable for a full-surface fit between individual moldings 4.

Here, the individual puzzle pieces 25 hook into one another with a form fit in such a manner that preferably only a gap capable of capillary action remains between adjacent puzzle pieces 25. The total number of puzzle pieces 25 laid in the recess 7 of the substrate 6, at which operation-related material removal has occurred, preferably results from the extent of the relevant material removal to be repaired plus any possible additional machining or recontouring.

On account of particular geometrical form properties, the puzzle pieces 25 can be expanded as a convexly or concavely delimited, planar polygonal body with their own kind to form a mosaic-like, areal covering which is extended as desired and merely leaves gaps between individual polygonal bodies.

Each puzzle piece 25 preferably has two projections 27, which at least have a convex form, and preferably two indentations 29, which at least have a concave form. These are formed around a main body 31, which preferably has a square or rectangular form.

The edge pieces 35 (FIG. 7) or corner pieces 33 (FIG. 6), which are adjacent to the edge of the recess 7, can also manage without indentations (as in the case of a jigsaw puzzle).

FIG. 8 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is foil led, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

It is also possible for a thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the mial barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 9 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 10 shows a combustion chamber 110 of a gas turbine. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrALX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shock.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

The invention claimed is:

1. A process for soldering a component, comprising:
    disposing a plurality of molding pieces on the component, the plurality of molding pieces including body portions engaged with one another and defining gaps between adjacent molding pieces,
        wherein the plurality of molding pieces further define continuous passages therethrough,
        wherein the continuous passages extend from a top side of the molding pieces to a bottom side of the molding pieces,
        wherein the continuous passages comprise porosity extending from the top side down to the bottom side,
    applying a solder material to a top surface of the molding pieces, and
    melting the solder material to pass the solder material through the continuous passages and to dispose the solder material within the gaps between adjacent molding pieces, and between the component and the molding pieces.

2. A molding for use in soldering a component comprising:
    a plurality of molding pieces to be disposed on the component, the plurality of molding pieces including body portions engaged with one another and defining gaps between adjacent molding pieces,
        wherein the plurality of molding pieces further define continuous passages therethrough,
        wherein the continuous passages extend from a top side of the molding pieces to a bottom side of the molding pieces,
        wherein the continuous passages comprise porosity extending from the top side down to the bottom side, and
    a solder material disposed on an outer surface of the moldings, wherein, upon melting of the solder material, molten solder material is passed through the continuous passages, within the gaps between adjacent molding pieces, and between the molding pieces and the component.

3. The molding as claimed in claim 2, wherein the molding pieces comprise a metal.

4. The molding as claimed in claim 3, wherein the molding pieces comprise a nickel-based or cobalt-based alloy.

5. The molding as claimed in claim 2, wherein a plurality of the molding pieces are in the form of double T-pieces.

6. The molding as claimed in claim 5, wherein at least one of the double T-pieces include an additional hooked formation.

7. The molding as claimed in claim 2, wherein the molding pieces comprise puzzle pieces having at least one convex projection and at least one concave indentation.

8. The molding as claimed in claim 7, wherein convex and also concave parts of individual puzzle pieces enable individual puzzle pieces to be hooked together with a form fit.

9. The molding as claimed in claim 2, wherein the plurality of molding pieces are hooked to one another.

* * * * *